US012645470B2

(12) United States Patent
Zhou et al.

(10) Patent No.: US 12,645,470 B2
(45) Date of Patent: Jun. 2, 2026

(54) MULTI-CLOUD PRIMARY NODE ELECTION

(71) Applicant: Dell Products L.P., Round Rock, TX (US)

(72) Inventors: Xueqiang Zhou, Shanghai (CN); Jim Lewei Ji, Shanghai (CN); Zhuo Zhang, Shanghai (CN); XiaoJun Wu, Shanghai (CN); Yuan Li, Suzhou (CN); Chris Haitao Luo, Shanghai (CN); Donald Mace, Mashpee, MA (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 18/902,045

(22) Filed: Sep. 30, 2024

(65) Prior Publication Data

US 2026/0093502 A1 Apr. 2, 2026

(51) Int. Cl.
*G06F 9/445* (2018.01)

(52) U.S. Cl.
CPC ................................. *G06F 9/44505* (2013.01)

(58) Field of Classification Search
None
See application file for complete search history.

(56) References Cited

U.S. PATENT DOCUMENTS

| | | | | |
|---|---|---|---|---|
| 11,928,500 B1 * | 3/2024 | Chow | .................... | G06F 16/245 |
| 2014/0365389 A1 * | 12/2014 | Cheek | .................. | G06Q 10/105 |
| | | | | 705/320 |
| 2017/0046374 A1 * | 2/2017 | Fletcher | ................. | G06Q 10/20 |
| 2021/0377713 A1 * | 12/2021 | Wei | ................... | H04W 52/0219 |

FOREIGN PATENT DOCUMENTS

| | | | | | |
|---|---|---|---|---|---|
| CN | 105264526 B | * | 12/2017 | ......... | G06F 16/9535 |
| CN | 105451361 B | * | 4/2019 | | |
| WO | WO-2011149178 A2 | * | 12/2011 | ............. | G06Q 50/18 |

\* cited by examiner

*Primary Examiner* — Christopher D Birkhimer
(74) *Attorney, Agent, or Firm* — Jackson Walker L.L.P.

(57) ABSTRACT

An information handling system may include at least one processor and a memory. The information handling system may be configured to: perform a first primary node election among a plurality of nodes of an information handling system cluster to determine a first primary node, wherein the first election is based on a common election algorithm; determine a cloud intent associated with the plurality of nodes; in response to a determination that the cloud intent is associated with an additional primary node requirement, perform a second primary node election among the plurality of nodes to determine a second primary node different from the first primary node, wherein the second election is based on a vertical election algorithm; and cause the second primary node to act as a primary node of the cluster of information handling systems.

18 Claims, 3 Drawing Sheets

MULTI-CLOUD PRIMARY NODE ELECTION

TECHNICAL FIELD

The present disclosure relates in general to information handling systems, and more particularly to the election of a primary node in a cluster of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Some HCI systems use a cloud platform manager (e.g., APEX Cloud Platform™ from Dell®) for handling various cloud management tasks. For example, a cloud platform manager may be used to install a particular cloud OS onto an HCI cluster to prepare it for use with a particular cloud platform (e.g., Amazon® AWS, Microsoft® Azure, Google® Cloud Platform, etc.). The choice of a particular cloud platform for a cluster is sometimes referred to as the cluster's "cloud intent."

In some cases, a cluster may include one node designated as the primary node, which can act as the bootstrap node for setting up and provisioning the cluster. In one implementation, the primary node may be elected by powering on the nodes to be provisioned and allowing them to auto-discover each other over the network. To elect a primary node, some designated characteristic of the nodes (e.g., their serial numbers) may be compared. The node with the lowest serial number may then be designated as the primary node. The primary node may present a wizard to the user to input information for cluster provisioning and handle the rest of the provisioning process.

This type of election algorithm based on the lowest serial number or some other node characteristic is referred to herein as a "common" election algorithm, which is to be contrasted with the "vertical" election algorithm described in more detail below.

However, this type of election algorithm may not be suitable in situations where the customer's environment contains physical nodes that are associated with more than one cloud intent. This is because different cloud intents may have different requirements for the primary node's hardware configuration in each cloud stack, and so simply selecting the node with the lowest serial number may not satisfy these requirements.

For instance, a cloud intent may require a storage nodes to server as primary, while a different cloud intent may require a compute node to serve as primary. Another cloud intent may require the presence of both storage and compute nodes in order to select a primary node. Yet other cloud intents may not impose any such requirements, instead allowing any node to serve as the primary. Given the existence of such divergent election requirements and potentially others as well, it is important to find a way to satisfy the requirements while using the same set of hardware nodes.

Embodiments of this disclosure are thus directed to techniques for electing the primary node that are suitable when multiple cloud intents are present.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with primary node election may be reduced or eliminated.

In accordance with embodiments of the present disclosure, an information handling system may include at least one processor and a memory. The information handling system may be configured to: perform a first primary node election among a plurality of nodes of an information handling system cluster to determine a first primary node, wherein the first election is based on a common election algorithm; determine a cloud intent associated with the plurality of nodes; in response to a determination that the cloud intent is associated with an additional primary node requirement, perform a second primary node election among the plurality of nodes to determine a second primary node different from the first primary node, wherein the second election is based on a vertical election algorithm; and cause the second primary node to act as a primary node of the cluster of information handling systems.

In accordance with these and other embodiments of the present disclosure, a method may include an information handling system performing a first primary node election among a plurality of nodes of an information handling system cluster to determine a first primary node, wherein the first election is based on a common election algorithm; the information handling system determining a cloud intent associated with the plurality of nodes; in response to a determination that the cloud intent is associated with an additional primary node requirement, the information handling system performing a second primary node election among the plurality of nodes to determine a second primary node different from the first primary node, wherein the second election is based on a vertical election algorithm; and the information handling system causing the second primary node to act as a primary node of the cluster of information handling systems.

In accordance with these and other embodiments of the present disclosure, an article of manufacture may include a non-transitory, computer-readable medium having computer-executable instructions thereon that are executable by an information handling system for: performing a first primary node election among a plurality of nodes of an information handling system cluster to determine a first primary node, wherein the first election is based on a common election algorithm; determining a cloud intent associated with the plurality of nodes; in response to a determination that the cloud intent is associated with an additional primary node requirement, performing a second primary node election among the plurality of nodes to determine a second primary node different from the first primary node, wherein the second election is based on a vertical election algorithm; and causing the second primary node to act as a primary node of the cluster of information handling systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
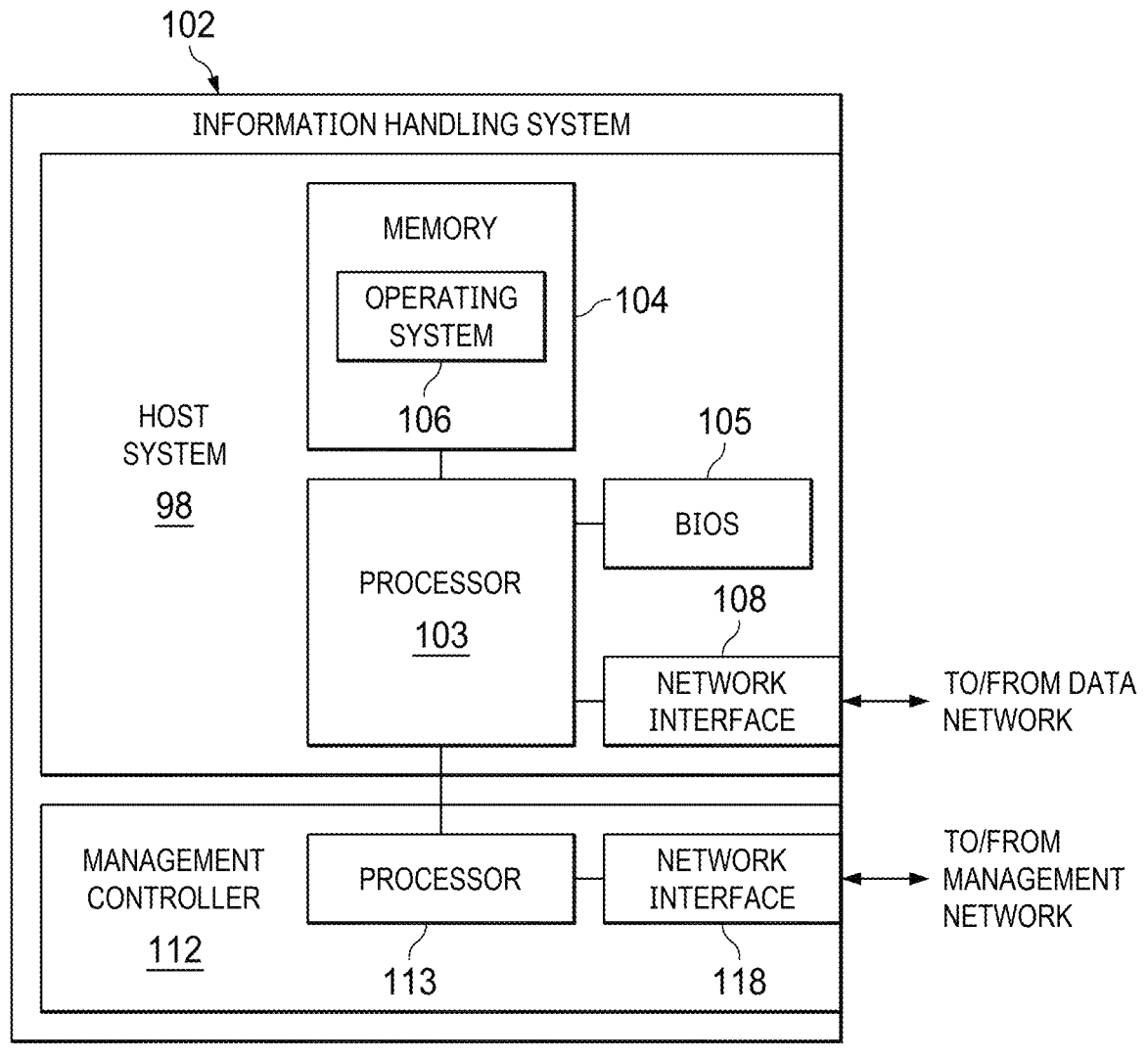
FIG. 1 illustrates a block diagram of an example information handling system, in accordance with embodiments of the present disclosure.
Figure 2:
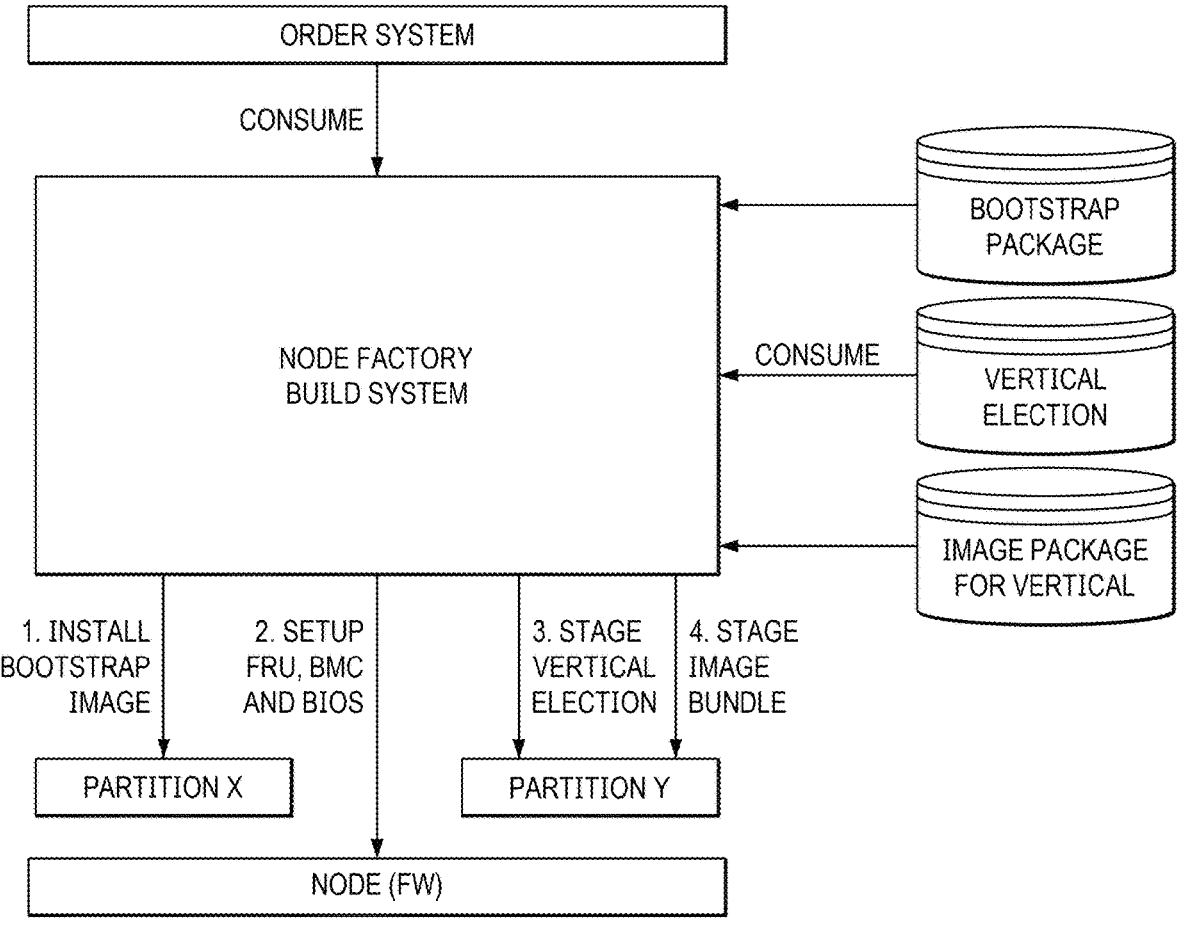
FIG. 2 illustrates a block diagram of an example architecture, in accordance with embodiments of the present disclosure.
Figure 3:
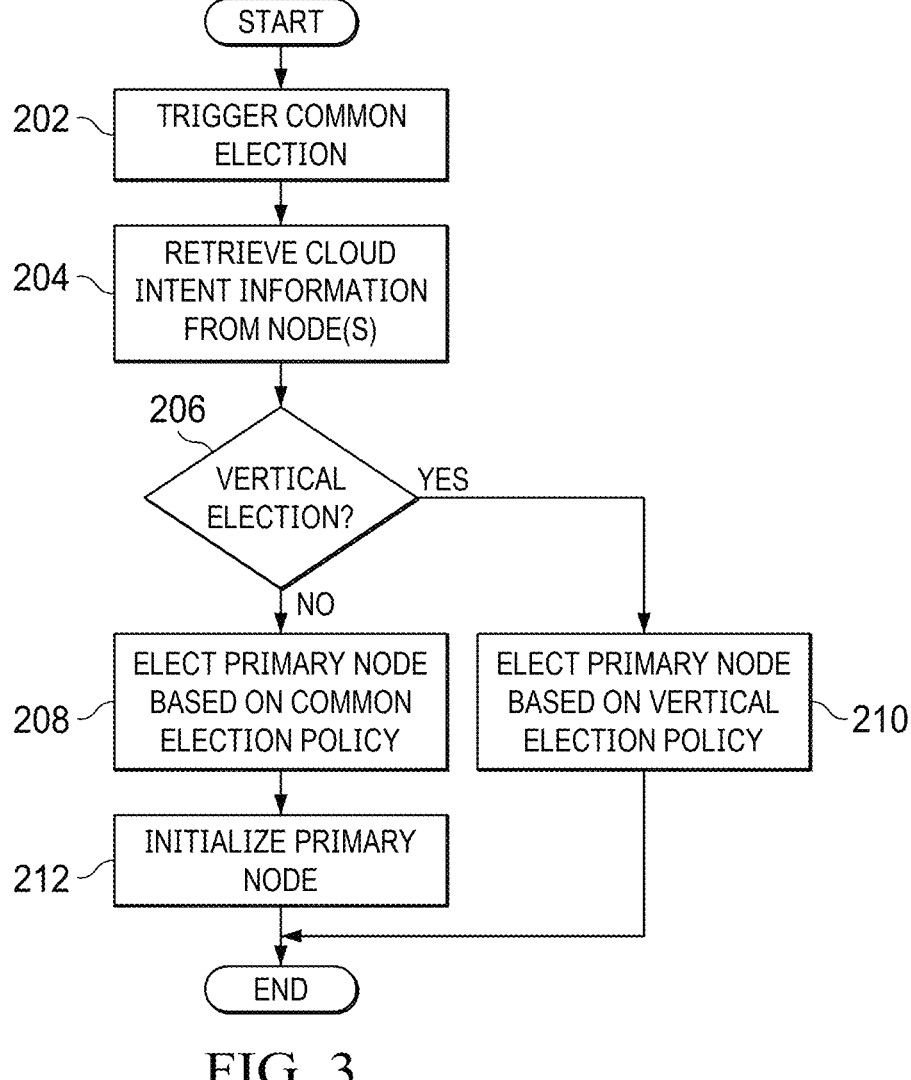
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may be used to elect a primary node in a cluster of information handling systems 102. Embodiments may leverage both the common election algorithm described above (in which some node characteristic such as the lowest serial number is used to determine the primary node), together with a vertical election algorithm that uses cloud intent information. Thus when the customer powers on the nodes, the common election algorithm may begin operation and attempt to detect the cloud intent. If necessary, the common election algorithm may then switch to the vertical election algorithm.

In general, the vertical election algorithm is a primary node election algorithm that respects the requirements of the detected cloud intent. For example, if the cloud intent requires that a storage node serve as primary, then the vertical election algorithm may select a storage node. In one embodiment, the vertical election algorithm may be implemented as a modified version of the common election algorithm (e.g., operating to select the node with the lowest serial number, but restricted to storage nodes only).

FIG. 2 illustrates an example architecture for implementing primary node election, according to some embodiments.

As shown, a factory build system for cluster nodes may consume information regarding a customer's order, as well as the appropriate bootstrap package, vertical election algorithm information, and a node image package associated with that vertical cloud intent.

The build system may then provision the node by installing the bootstrap image onto a first partition of a storage resource. The build system may provision firmware components such as the field-replaceable unit (FRU), the BMC, and the BIOS of the node. (Generally, a FRU is a component that can be easily removed and replaced. A FRU typically has hardware definition information such as manufacturer, model number, serial number, etc. stored thereon.)

The build system may then stage the vertical election algorithm and the associated image package onto a different partition of a storage resource. The node may then be shipped to the customer for cabling and initialization.

Turning now to FIG. 3, an example method is shown. When the nodes of a new cluster are cabled and turned on, they may begin by triggering the common election algorithm at step 202. The primary node that (provisionally) wins the common election algorithm may then retrieve the cloud intent information from all nodes at step 204. For example, it may retrieve the order information stored on the nodes at the factory indicating their cloud intent.

If the cloud intent information does not require a special vertical election at step 206, then the elected primary node from step 202 may remain primary at step 208.

If the cloud intent does require a vertical election, then at step 210, the vertical election algorithm may select a new primary node at step 210. In either case, the elected primary node may then be initialized at step 212, and it may manage the remainder of cluster provisioning and bring-up.

One of ordinary skill in the art with the benefit of this disclosure will understand that the preferred initialization point for the method depicted in FIG. 3 and the order of the steps comprising that method may depend on the implementation chosen. In these and other embodiments, these method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
perform a first primary node election among a plurality of nodes of an information handling system cluster to determine a first primary node, wherein the first election is based on a common election algorithm;
determine a cloud intent associated with the plurality of nodes;
in response to a determination that the cloud intent is associated with an additional primary node requirement, perform a second primary node election among the plurality of nodes to determine a second primary node different from the first primary node, wherein the second election is based on a vertical election algorithm; and
cause the second primary node to act as a primary node of the cluster of information handling systems.

2. The information handling system of claim 1, wherein the common election algorithm is based on serial numbers of the plurality of nodes.

3. The information handling system of claim 2, wherein the common election algorithm comprises selecting a particular node based on its serial number being lower than all other node serial numbers of the information handling system cluster.

4. The information handling system of claim 1, wherein the vertical election algorithm comprises a modified version of the common election algorithm.

5. The information handling system of claim 4, wherein the vertical election algorithm comprises selecting a particular node from a designated subset of the nodes of the information handling system cluster based on its serial number being lower than all other node serial numbers in the designated subset.

6. The information handling system of claim 1, wherein the primary node is configured to carry out provisioning of the information handling system cluster.

7. A method comprising:
an information handling system performing a first primary node election among a plurality of nodes of an information handling system cluster to determine a first primary node, wherein the first election is based on a common election algorithm;
the information handling system determining a cloud intent associated with the plurality of nodes;
in response to a determination that the cloud intent is associated with an additional primary node requirement, the information handling system performing a second primary node election among the plurality of nodes to determine a second primary node different from the first primary node, wherein the second election is based on a vertical election algorithm; and
the information handling system causing the second primary node to act as a primary node of the cluster of information handling systems.

8. The method of claim 7, wherein the common election algorithm is based on serial numbers of the plurality of nodes.

9. The method of claim 8, wherein the common election algorithm comprises selecting a particular node based on its serial number being lower than all other node serial numbers of the information handling system cluster.

10. The method of claim 7, wherein the vertical election algorithm comprises a modified version of the common election algorithm.

11. The method of claim 10, wherein the vertical election algorithm comprises selecting a particular node from a designated subset of the nodes of the information handling system cluster based on its serial number being lower than all other node serial numbers in the designated subset.

12. The method of claim 7, wherein the primary node is configured to carry out provisioning of the information handling system cluster.

13. An article of manufacture comprising a non-transitory, computer-readable medium having computer-executable instructions thereon that are executable by an information handling system for:

performing a first primary node election among a plurality of nodes of an information handling system cluster to determine a first primary node, wherein the first election is based on a common election algorithm;

determining a cloud intent associated with the plurality of nodes;

in response to a determination that the cloud intent is associated with an additional primary node requirement, performing a second primary node election among the plurality of nodes to determine a second primary node different from the first primary node, wherein the second election is based on a vertical election algorithm; and causing the second primary node to act as a primary node of the cluster of information handling systems.

14. The article of claim 13, wherein the common election algorithm is based on serial numbers of the plurality of nodes.

15. The article of claim 14, wherein the common election algorithm comprises selecting a particular node based on its serial number being lower than all other node serial numbers of the information handling system cluster.

16. The article of claim 13, wherein the vertical election algorithm comprises a modified version of the common election algorithm.

17. The article of claim 16, wherein the vertical election algorithm comprises selecting a particular node from a designated subset of the nodes of the information handling system cluster based on its serial number being lower than all other node serial numbers in the designated subset.

18. The article of claim 13, wherein the primary node is configured to carry out provisioning of the information handling system cluster.

\* \* \* \* \*